R. T. ANDERSON.
HATCH.
APPLICATION FILED MAY 8, 1915.

1,195,763.

Patented Aug. 22, 1916.
2 SHEETS—SHEET 1.

Witness:
Harry G. Fleischer

Inventor:
Rupert T. Anderson
by attorneys

R. T. ANDERSON.
HATCH.
APPLICATION FILED MAY 8, 1915.

1,195,763.

Patented Aug. 22, 1916.
2 SHEETS—SHEET 2.

Witness:
Harry G. Fleischer

Inventor:
Robert T. Anderson
by attorneys

UNITED STATES PATENT OFFICE.

RUPERT T. ANDERSON, OF NEW YORK, N. Y.

HATCH.

1,195,763.	Specification of Letters Patent.	Patented Aug. 22, 1916.

Application filed May 8, 1915. Serial No. 26,810.

*To all whom it may concern:*

Be it known that I, RUPERT T. ANDERSON, a citizen of the United States, and resident of the borough of Manhattan, in the city and State of New York, have invented a new and useful Improvement in Hatches, of which the following is a specification.

This invention relates to an improvement in hatches and has for its object to provide a structure whereby the strong-backs installed within the hatch for supporting the hatch covers may be readily moved out of the way or may be removed entirely from the hatch as desired, the strong-backs having a movable interlocked engagement with the sides of the hatch whereby the sides are prevented from spreading or being distorted.

A practical embodiment of my invention is represented in the accompanying drawings, in which—

Figure 1:
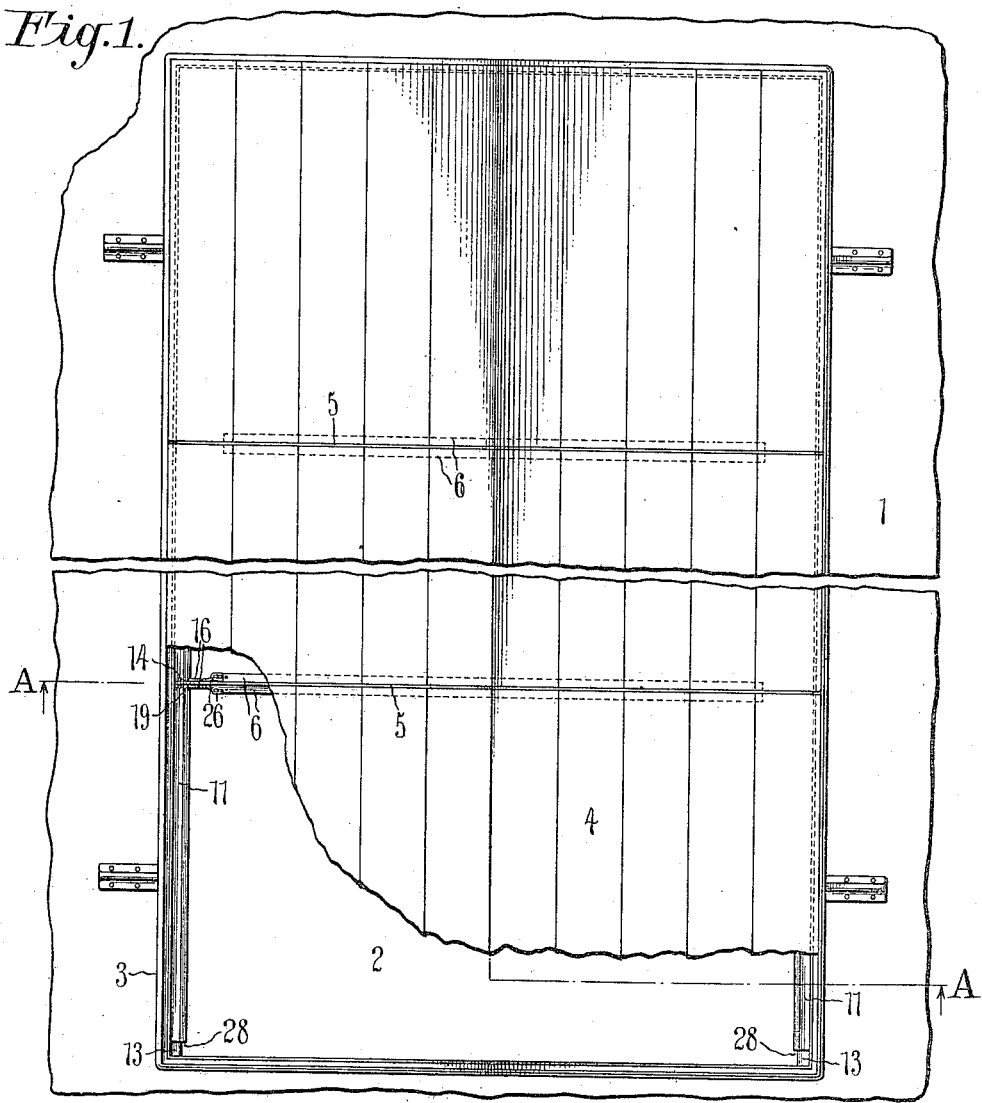
Figure 2:
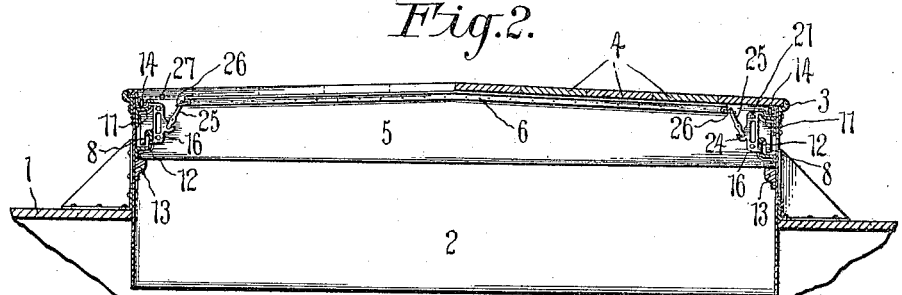
Figure 3:
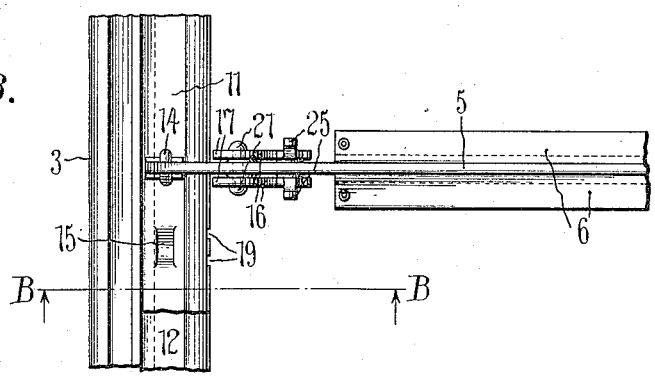
Figure 5:
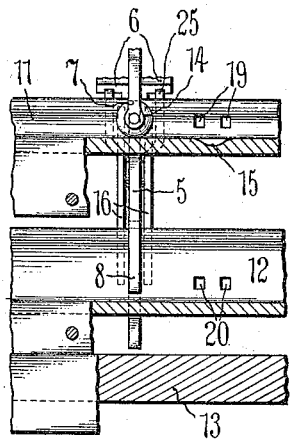
Figure 4:
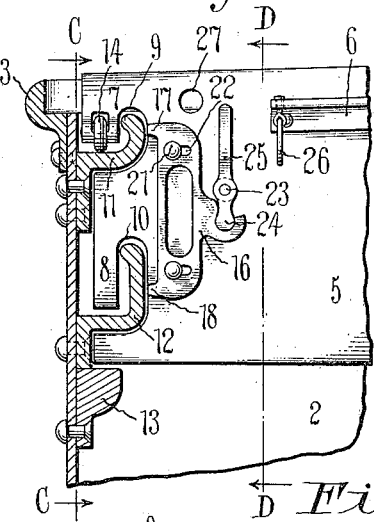
Figure 6:
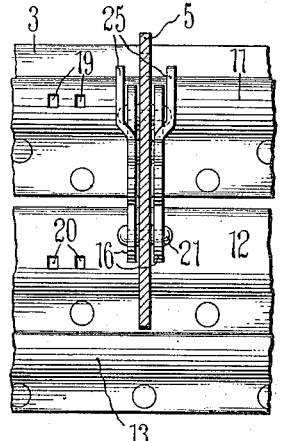
Figure 8:
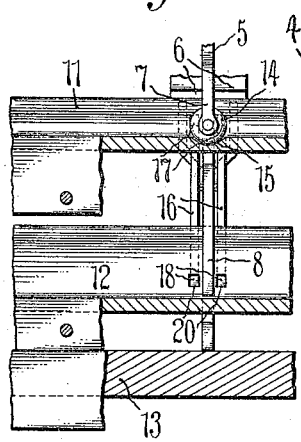
Figure 7:
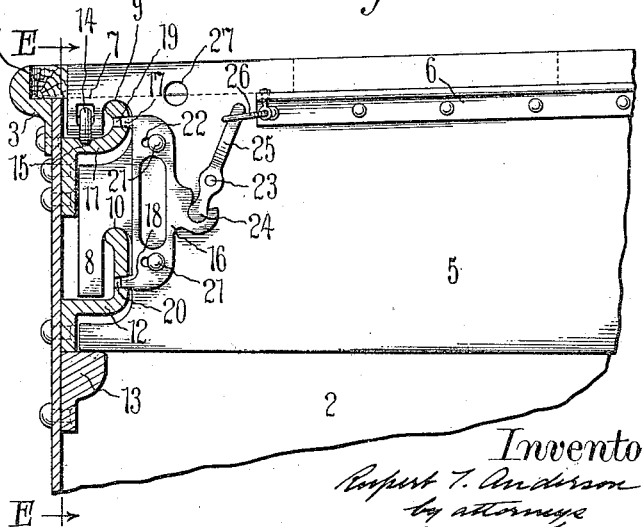

Figure 1 is a top plan view of a hatch with its covers in position thereon, portions of the covers being broken away to show the parts beneath them, Fig. 2 is a transverse section taken in the plane of the line A—A of Fig. 1, Fig. 3 is a detail plan view on an enlarged scale of a portion of a strong-back and a portion of the hatch adjacent thereto, showing the parts in their unlocked position, Fig. 4 is a transverse section taken in the plane of the line B—B of Fig. 3, Fig. 5 is a section taken in the plane of the line C—C of Fig. 4, looking in the direction of the arrows, Fig. 6 is a section taken in the plane of the line D—D of Fig. 4, looking in the direction of the arrows, Fig. 7 is a transverse section similar to Fig. 4, showing the parts in their locked position, and Fig. 8 is a section taken in the plane of the line E—E of Fig. 7, looking in the direction of the arrows.

The deck is denoted by 1, the hatch opening by 2, the hatch coaming by 3 and the hatch covers by 4. These parts may be of any well known or approved form.

Each strong-back 5 is provided on its opposite sides with flanges 6 for supporting the ends of the hatch covers intermediate the ends of the hatch opening. Each end of the strong-back is provided with an upper hook 7 and a lower hook 8 forming, respectively, recesses 9 and 10 for the reception of the uprising edges of a track rail 11 and a guide rail 12 secured permanently to the inside of the coaming 3 along the sides of the hatch opening.

A supporting rail 13 is secured to the inside of the coaming 3 along each side of the hatch opening below the guide rail 12 in position to distribute the weight of the strong-back between it and the guide rail 12, when the weight of the strong-back is removed from its traction wheels, as will immediately hereinafter appear.

The upper hook 7 at each end of the strong-back is provided with a traction wheel 14 arranged to travel along the track rail 11 for permitting the strong-back to be moved bodily toward either end of the hatch opening.

A recess 15 is provided in each traction rail 11 in the transverse plane of the strong-back when the strong-back is in its supporting position, which recess is of sufficient depth to transfer the weight of the strong-back from the traction wheel 14 to the guide rail 12 and supporting rail 13.

At each or one end only of the strong-back, I provide, on one or both sides thereof, a locking bolt 16 having projections 17, 18, arranged to enter holes 19, 20, respectively, in the track rail 11 and guide rail 12. This bolt has pin and slot connections 21, 22, with the strong-back. An operating lever is pivoted to the side of the strong-back at 23 and has one arm 24 engaged with the bolt and its other arm 25 acting as a handle for manipulating the bolt. A retaining ring 26 is suspended from the flange 6 in position to engage the handle 25 of the operating lever for holding the bolt in its thrown position.

It is to be understood that there are as many of these strong-backs as may be required for the particular hatch opening for which they are intended.

The strong-backs are provided with holes 27 at their ends near their upper edges for the passage therethrough of a rope or other means, not shown herein, for moving the strong-backs bodily toward either end of the hatch opening. At the ends of the hatch opening, the track rails 11 are cut away as shown at 28 so as to permit the removal of the strong-backs from the hatch by a vertical movement. If it is not desired to remove these strong-backs, they may be moved to one or both ends of the hatch opening and permitted to remain there or they may be moved a lesser distance if a lesser free opening of the hatch is required.

The movable interlocked engagement of the strong-backs with the sides of the hatch opening serves to prevent the spreading or distortion thereof.

It is evident that slight changes may be resorted to in the form, construction and arrangement of the several parts without departing from the spirit and scope of my invention; hence I do not wish to limit myself strictly to the structure herein set forth, but

What I claim is:

1. A hatch having rails along its sides, a strong-back movable along said rails, and means engaging the rails for locking the strong-back thereto.

2. A hatch having rails along its sides, a strong-back having a movable interlocked engagement with said rails, and means engaging the rails for locking the strong-back thereto.

3. A hatch having track and supporting rails along its sides and a strong-back having wheels fitted to travel along the track rails, said track rails being constructed to transfer the weight of the strong-back from the wheels to the supporting rails when the strong-back is in position.

4. A hatch having track and supporting rails along its sides, a strong-back having wheels fitted to travel along the track rails, said track rails being constructed to transfer the weight of the strong-back from the wheels to the supporting rails when the strong-back is in position, and means for locking the strong-back in position.

5. A hatch having track and guide rails along its sides and a strong-back having wheels fitted to travel along the track rails, said track rails being constructed to transfer the weight of the strong-back from the wheels to the guide rails when the strong-back is in position.

6. A hatch having track and guide rails along its sides, a strong-back having wheels fitted to travel along the track rails, said track rails being constructed to transfer the weight of the strong-back from the wheels to the guide rails when the strong-back is in position, and means for locking the strong-back in position.

7. A hatch having track, guide and supporting rails along its sides and a strong-back having wheels fitted to travel along the track rails, said track rails being constructed to transfer the weight of the strong-back from the wheels to the guide and supporting rails when the strong-back is in position.

8. A hatch having track, guide and supporting rails along its sides and a strong-back having wheels fitted to travel along the track rails, said track rails being constructed to transfer the weight of the strong-back from the wheels to the guide and supporting rails when the strong-back is in position, and means for locking the strong-back in position.

In testimony, that I claim the foregoing as my invention, I have signed my name this 29th day of April, 1915.

RUPERT T. ANDERSON.

Copies of this patent may be obtained for five cents each, by addressing the "Commissioner of Patents, Washington, D. C."